United States Patent
Li (10) Patent No.: US 8,824,450 B2
(45) Date of Patent: Sep. 2, 2014

(54) SYNCHRONISING A COMMUNICATIONS DEVICE

(75) Inventor: Yunxin Li, Vaucluse (AU)

(73) Assignee: Nitero Pty Limited, Fitzroy (AU)

( * ) Notice: Subject to any disclaimer, the term of this patent is extended or adjusted under 35 U.S.C. 154(b) by 158 days.

(21) Appl. No.: 13/321,517

(22) PCT Filed: May 18, 2010

(86) PCT No.: PCT/AU2010/000581
§ 371 (c)(1),
(2), (4) Date: Jan. 11, 2012

(87) PCT Pub. No.: WO2010/132925
PCT Pub. Date: Nov. 25, 2010

(65) Prior Publication Data
US 2012/0099583 A1    Apr. 26, 2012

(30) Foreign Application Priority Data

May 19, 2009   (AU) ................................ 2009902257

(51) Int. Cl.
*H04W 56/00* (2009.01)

(52) U.S. Cl.
USPC ............ 370/350; 370/503; 370/509; 370/512

(58) Field of Classification Search
CPC ..... H04W 56/00; H04J 3/0682; H04J 3/0685; H04J 3/0664; H04J 3/0608; H04J 3/0605; H04J 2203/0089
USPC .................................. 370/350, 503, 509, 512
See application file for complete search history.

(56) References Cited

U.S. PATENT DOCUMENTS

| | | | |
|---|---|---|---|
| 6,621,811 B1 | 9/2003 | Chang et al. | |
| 7,336,633 B2 | 2/2008 | Kruys | |
| 7,366,200 B2 | 4/2008 | Laroia et al. | |
| 2001/0004601 A1* | 6/2001 | Drane et al. | 455/456 |

(Continued)

FOREIGN PATENT DOCUMENTS

| | | |
|---|---|---|
| CA | 2475849 | 12/2010 |
| EP | 0969602 | 12/2006 |

(Continued)

OTHER PUBLICATIONS

Mai Vu et al., "Interference in a Cognitive Network with Beacon", IEEE Wireless Communications and Networking Conference, Mar. 31, 2008-Apr. 4, 2008, pp. 876-881.

(Continued)

*Primary Examiner* — Ronald Abelson
(74) *Attorney, Agent, or Firm* — Hickman Palermo Truong Becker Bingham Wong LLP (57) ABSTRACT

In one aspect, the method of synchronizing a communications device in a wireless communications network comprises receiving a beacon signal at a first frequency; and receiving a data signal at a second frequency, the beacon signal being used to synchronize reception of the data signal. In another aspect, the method comprises transmitting a beacon signal at a first frequency; and transmitting a data signal at a second frequency, the beacon signal being useable to synchronize reception of the data signal. The first frequency is substantially less than the second frequency such that the beacon signal experiences substantially different frequency-dependent propagation effects to the data signal.

36 Claims, 5 Drawing Sheets

(56) References Cited

U.S. PATENT DOCUMENTS

| | | | |
|---|---|---|---|
| 2001/0040933 A1* | 11/2001 | Eriksson et al. | 375/350 |
| 2001/0050960 A1* | 12/2001 | Peeters | 375/260 |
| 2002/0161884 A1* | 10/2002 | Munger et al. | 709/224 |
| 2002/0175853 A1* | 11/2002 | Peeters et al. | 342/353 |
| 2004/0121728 A1* | 6/2004 | Gibson et al. | 455/12.1 |
| 2004/0174812 A1* | 9/2004 | Murakami et al. | 370/215 |
| 2005/0128934 A1* | 6/2005 | Gu et al. | 370/206 |
| 2005/0135611 A1 | 6/2005 | Hardacker | |
| 2006/0126705 A1* | 6/2006 | Bachl et al. | 375/148 |
| 2007/0280689 A1* | 12/2007 | Boffi et al. | 398/65 |
| 2008/0002652 A1* | 1/2008 | Gupta et al. | 370/338 |
| 2008/0101487 A1* | 5/2008 | Muck et al. | 375/260 |
| 2008/0242307 A1 | 10/2008 | Ho et al. | |
| 2008/0273644 A1* | 11/2008 | Chesnutt et al. | 375/370 |
| 2009/0170430 A1* | 7/2009 | Rangan et al. | 455/39 |
| 2011/0006914 A1* | 1/2011 | Tsuda | 340/905 |

FOREIGN PATENT DOCUMENTS

| | | | | |
|---|---|---|---|---|
| JP | 2256711 | * | 12/2010 | G08G 1/09 |
| WO | WO 01/01717 | | 1/2001 | |
| WO | WO 2007/082036 | | 7/2007 | |

OTHER PUBLICATIONS

PCT International Search Report and Written Opinion of the International Searching Authority, Australian Patent Office, Application No. PCT/AU2010/000581, Jun. 1, 2010, 7 pages.

* cited by examiner

| Pre-amble1 (f$_L$) | GI | Pre-amble2 (f$_H$) | Header (f$_H$) | Payload (f$_H$) |

Fig. 6

| Pre-amble1 (f$_L$) | Header (f$_L$) | GI | Pre-amble2 (f$_H$) | Payload (f$_H$) |

Fig. 7

| Pre-amble1 (f$_L$) | Sync/ Manage (f$_L$) | GI | Pre-amble2 (f$_H$) | Header (f$_H$) | Payload (f$_H$) |

Fig. 8

SYNCHRONISING A COMMUNICATIONS DEVICE

TECHNICAL FIELD

The present invention relates to wireless data communications, and in particular to methods of synchronising a communications device in a wireless communications network, a receiving device, a transmitting device, a wireless communications system comprising the receiving device and the transmitting device, and computer program to implement the method.

BACKGROUND OF THE INVENTION

When a radio frequency (RF) signal propagates from a transmitter (TX) through a transmission media to the receiver (RX), the signal strength is reduced due to path loss. The path loss is proportional to $f^L$, where f is the frequency of the signal and L is an environment-dependent parameter. In a practical non-line-of-sight (NLOS) environment, the parameter L is normally between 2 and 4. This physical law suggests that the higher the operating frequency is, the higher its path loss is within the same operating range. This means that more energy per information bit has to be radiated, compared to a lower frequency band.

One characteristic of high frequency bands, such as an extremely high frequency (EHF) band ranging from 30 GHz to 300 GHz, is that atmospheric loss is substantial. To overcome extra path loss on high frequency bands, traditionally the prior art EHF communication systems use directional antennas, such as horn antennas, with substantial antenna gains in both transmission and reception. Another approach was to use multiple antenna arrays and beam-forming techniques to form directional beams between the transmitter and receiver.

While high-gain directional antennas work well for fixed point-to-point communications, they create problems when the stations or nodes are portable or mobile. The hidden node/network is a typical problem, where a network is composed of two or more connected nodes. In the prior art, a node normally scans/tests the channel on the operating frequency band immediately after it is powered on. For example, a new node intending to use to a channel in the EHF band will tune its receiver to the EHF channels and determine the channel status (free or occupied) by analyzing the signals received.

If a node/network is detected, the new node may decide to join the existing node/network or initiate a new network on another free channel. However, the fact that both the transmitter and receiver antennas are highly directional means that the new node can only detect an existing node/network if their antenna directions happen to be aligned by chance. As a result, the probability of missing the detection of an existing node/network is very high. If a new node misses the detection of the existing nodes on the channel, the new node will either miss the opportunity to join the existing nodes or the new node will use the channel and cause interference for the others. Interference between existing nodes can also happen. For example, a receiver receiving data from a transmitter can be disturbed by an another transmitter of a $3^{rd}$ node, as the $3^{rd}$ node cannot hear the communication between the first two nodes and assumes the first two nodes are idle.

To establish and maintain a network on the EHF channel under these traditional scenarios, many management messages have to be exchanged. Because each node in the network uses highly directional antennas, effective broadcast and multicast schemes cannot be applied. One solution is to let the transmitter and receiver repeatedly transmit and receive at all directions for a long time, to increase the chance of antenna direction alignment. This solution is however not power efficient. Another problem is that it is very hard for a new node to become synchronized to the existing nodes in time and frequency.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect, there is provided method of synchronising a communications device in a wireless communications network, the method comprising:
  receiving a beacon signal at a first frequency; and
  receiving a data signal at a second frequency, the beacon signal being used to synchronise reception of the data signal;
  wherein the first frequency is substantially less than the second frequency such that the beacon signal experiences substantially different frequency-dependent propagation effects to the data signal.

The present method is useful in communication systems where a receiving device has to synchronise with a transmitting device, such as its frequency and/or timing. By receiving the beacon signal at a first frequency that is substantially less than the second frequency, the beacon signal can be more reliably received by the receiving device due to substantially lower path loss experienced by the beacon signal at the first frequency when compared to that of the data signal at the higher second frequency. Advantageously, the present method lowers total power consumption at the receiving device due to lower current drain in transmitting and receiving a beacon signal. For portable devices, lower power consumption translates into higher battery life and stand-by time, and throughput.

The present method is suitable for, but not limited to, use in power-efficient mobile communications systems primarily operating on the extremely high frequency (EHF) band from 30 GHz to 300 GHz, or higher frequency bands such as on the super high frequency (SHF) band from 3 GHz to 30 GHz. In some embodiments, the second frequency is in the range 57 to 64 GHz. In these or other embodiments, the first frequency may be substantially 900 MHz, or 2.4 GHz, or 5 GHz.

In these embodiments, the present method is to be contrasted with existing methods that perform synchronization on the EHF channel, which are inefficient in both power and time due to the high path loss of the EHF channel. Other losses affecting the EHF such as a 60 GHz radio may include the extra attenuation due to oxygen and moisture or water, larger noise in the analogue transmitter and receiver circuits, larger phase noise of the analogue transmitter and receiver circuit, and larger in-phase and Quadrature channel (I-Q) imbalance of the analogue transmitter and receiver circuits.

The beacon signal may be received using an omni-directional antenna. The data signal may be received using a directional antenna.

The method may further comprise determining timing or frequency, or both, of a transmitting device from the beacon signal. In this case, the method may further comprising adjusting timing or frequency, or both, of the receiving device based on the determined timing or frequency, or both of the transmitting device.

The beacon signal may be a carrier-less digital signal. In this case, the method may further comprise sampling the beacon signal without down-mixing.

The beacon signal and data signal may be time division multiplexed. The method may further comprise converting the beacon signal and data signal using a shared digital-to-analogue converter (DAC).

The beacon signal may be received at the first frequency as part of a sync signal. The sync signal may further include at least one of the following: an acknowledgement (ACK) signal, a feedback signal, a command signal, or a control signal.

According to a second aspect, there is provided a method synchronising a communications device in a wireless communications network, the method comprising:
  transmitting a beacon signal at a first frequency; and
  transmitting a data signal at a second frequency, the beacon signal being useable to synchronise reception of the data signal;
  wherein the first frequency is substantially less than the second frequency such that the beacon signal experiences substantially different frequency-dependent propagation effects to the data signal.

Similar to the first aspect, the second frequency may be in the range 57 to 64 GHz. In these or other embodiments, the first frequency may be substantially 900 MHz, or 2.4 GHz, or 5 GHz.

Similar to the first aspect, the beacon signal may be received using an omni-directional antenna. The data signal may be received using a directional antenna.

In a third aspect, there is provided a receiving device configured to carry out the method of the first aspect. In a fourth aspect, there is provided a transmitting device configured to carry out the method of the second aspect.

In a fifth aspect, there is provided a system comprising a transmitting device in accordance with the fourth aspect and a receiving device in accordance with the third aspect. In a sixth aspect, there is provided computer program to implement the method in accordance with the first aspect or the second aspect, or both.

BRIEF DESCRIPTION OF THE DRAWINGS

Non-limiting example(s) of the invention will now be described with reference to the following drawings, in which.

DETAILED DESCRIPTION

Figure 1:
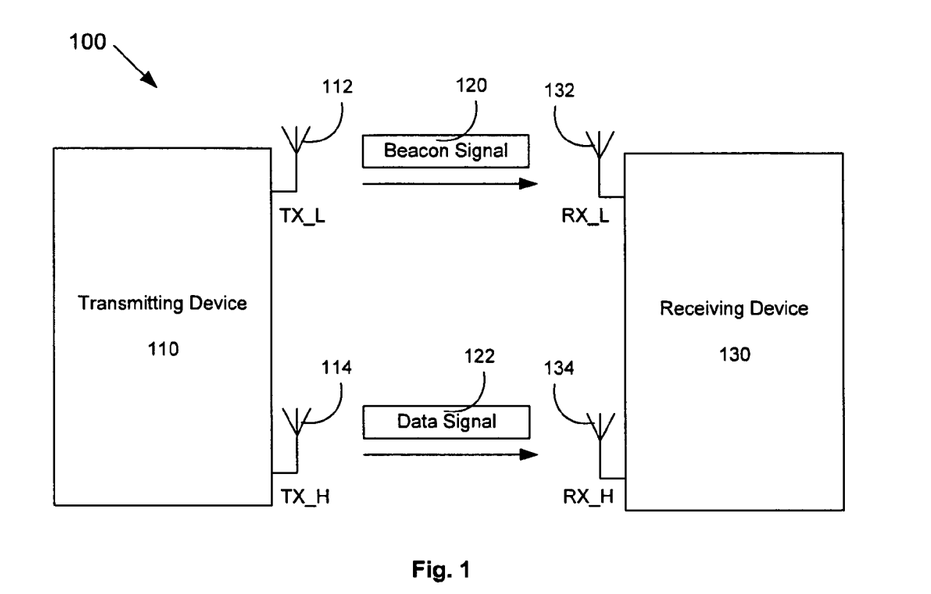
FIG. 1 is a schematic diagram of a system comprising a transmitting device and a receiving device.

Referring first to FIG. 1, the system 100 comprises a first communications device 110 and a second communications device 130 operable to communicate with each other in a wireless communications network.

The devices 110 and 130 may be a mobile phone, a personal digital assistant (PDA) device, a desktop computer, a laptop computer or a tablet computer. The network may be a Institute of Electrical and Electronics Engineers (IEEE) 802.11 wireless network using wireless standards such as 802.11a, 11b, 11g, or 11ad. The specifications of IEEE 802.11 can be found, for example, on the IEEE Standards website at http://standards.ieee.org/getieee802/802.11.html, and are incorporated herein by reference.

In one example, the first communications device 110 is a transmitting device that wishes to transmit data signals to the second communications device 130, which is the receiving device. While not shown, the second communications device 130 may also be a transmitting device and vice versa. Before any data signals sent by the transmitting device 110 can be reliably received by the receiving device 130, the receiving device 130 has to synchronise its carrier frequency and time or clock with those of the transmitting device 110.

To facilitate synchronisation between the devices 110 130, a beacon signal is sent by the transmitting device 110 periodically so that the receiving device 130, after power-up, is able to search for the beacon signal.

In particular, the transmitting device 110 has two transmit antennas:
  Omni-directional transmit antenna (TX_L) 112 is operable to transmit a beacon signal 120 to the receiving device 130 at a lower frequency band, $f_L$, which may be 900 MHz, or 2.4 GHz, or 5 GHz.
  Directional transmit antenna 114 (TX_H) is operable to transmit at least one data signal 122 to the receiving device 130 in a higher frequency band, $f_H$, which may be in the range of 57 to 64 GHz.

Correspondingly, the receiving device 130 has two receive antennas to receive signals transmitted by the transmitting device 110:
  Omni-directional receive antenna (RX_L) 132 is operable to receive a beacon signal 120 transmitted by transmit antenna (TX_L) 112 at a lower frequency band, $f_L$, which may be 900 MHz, or 2.4 GHz, or 5 GHz.
  Directional receive antenna (RX_H) 134 is operable to receive at least one data signal 122 transmitted by transmit antenna (TX_H) 114 at a higher frequency band, $f_H$, which may be in the range of 57 to 64 GHz.

The beacon signal 120 can then be used to synchronise reception of the data signal 122. Upon receiving the beacon signal 120, the receiving device 130 analyses the beacon signal 120 and adjusts its frequency and timing to match those of the transmitting device 110.

By transmitting the beacon signal 120 at the lower frequency band, the beacon signal can therefore be received by the receiving device 130 more reliably. This also substantially reduces power consumption of the receiving device 130 and therefore increases stand-by time. Further, transmitting the data signal 122 in the large band of 57 to 64 GHz permits increased data throughput.

Compared to the higher frequency band, $f_H$, the path loss of a channel on the lower frequency band, $f_L$ is lower due to lower levels of oxygen absorption and rain attenuation. For example, we compare the path loss of a 60 GHz channel and that of a 2.4 GHz channel, both bands being for unlicensed use. The extra path loss of the 60 GHz channel, above the path loss of the 2.4 GHz channel, is within the range of 42 dB to 56 dB using environment-dependent parameter L=2 and 3 respectively:

$$[10 \log_{10}(60/2.4)^3 \text{ dB}, 10 \log_{10}(60/2.4)^4 \text{ dB}] = [42 \text{ dB}, 56 \text{ dB}].$$

Figure 2:
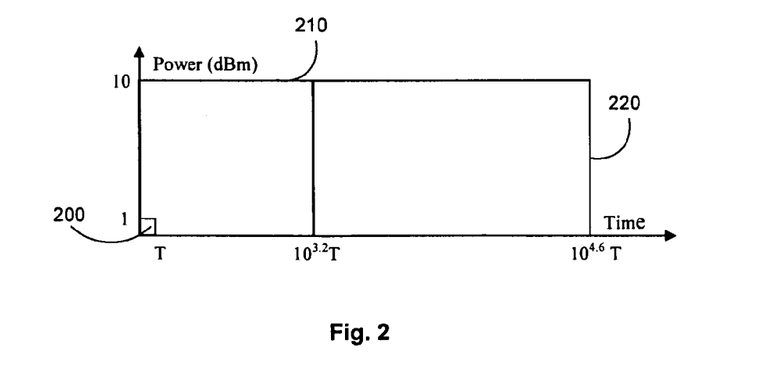
FIG. 2 illustrates the time and power requirements to convey a reference amount of energy to a receiving device when using the 2.4 GHz band and the 60 GHz band respectively.

FIG. 2 illustrates the transmit power (dBm) and time needed by an equivalent transceiver to deliver equal energy via the 60 GHz and 2.4 GHz channels, respectively. The box 200 at bottom left illustrates a reference power and time required by a 2.4 GHz transmitter. The two larger boxes in FIG. 2 show the transmit power 210 and time 220 required by a 60 GHz transmitter to effect the same energy transfer. This means that omni-directional antennas are more suitable for transmitting the beacon signal 120 on the lower frequency band, while directional antennas are more suitable for transmitting the data signal 122 on the higher frequency band.

Figure 3:
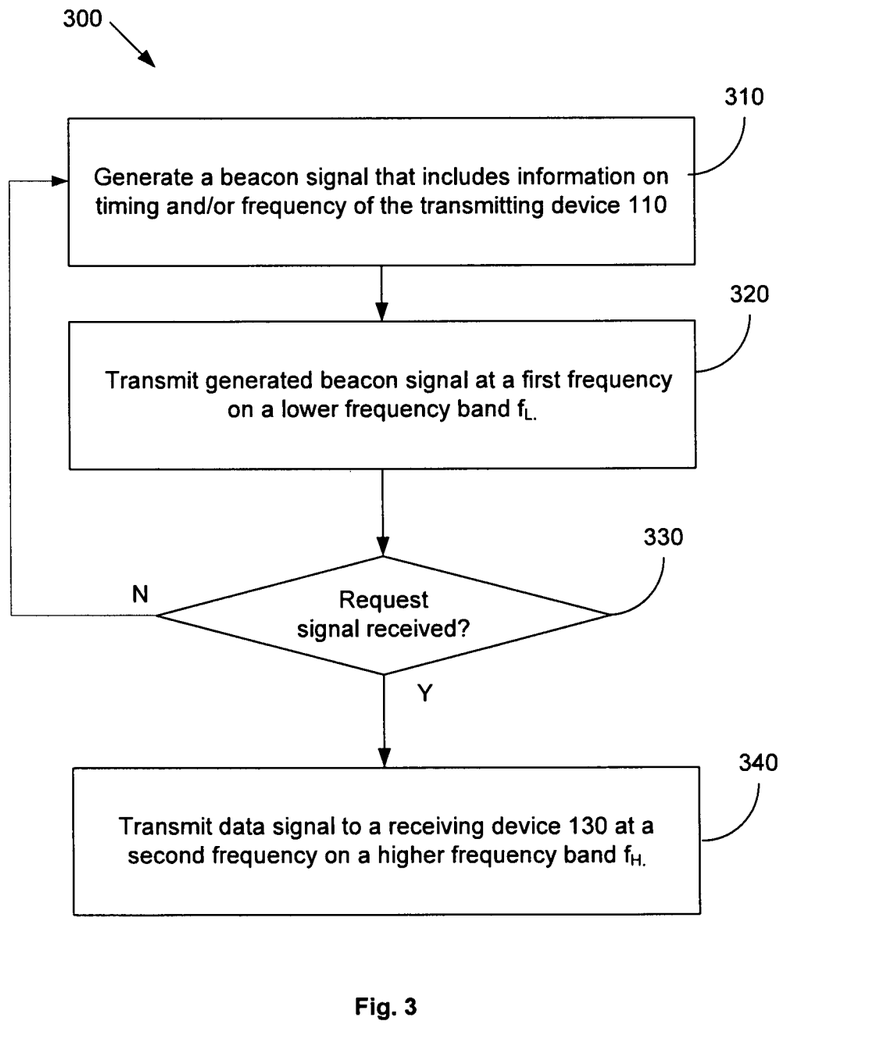
FIG. 3 is a flowchart of steps performable by a transmitting device.
Figure 4:
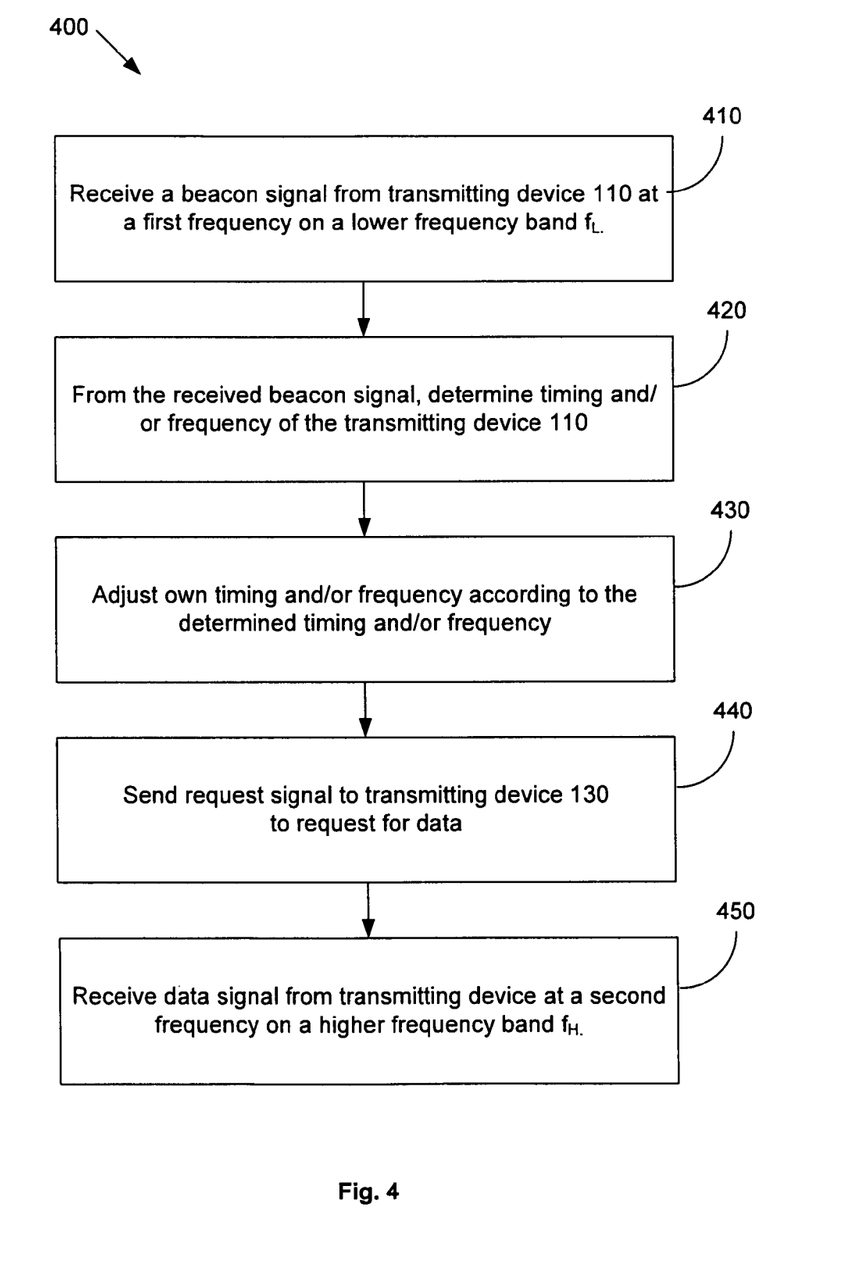
FIG. 4 is a flowchart of steps performable by a receiving device.

FIG. 3 and FIG. 4 illustrate steps performed by the transmitting device 110 and receiving device 130 for synchronisation respectively.

Referring first to FIG. 3, the transmitting device 110 first generates a beacon signal 120 that includes information on timing and/or frequency of the device 110 itself; step 310.

The beacon signal 120 is then transmitted at a first frequency on a lower frequency band, $f_L$, using an omni-directional transmit antenna 112 at the transmitting device 110; see step 320.

At power-up, the receiving device 130 searches for a beacon signal 120 and may decide to join and synchronize with the transmitting device 110. Referring also to FIG. 4, the receiving device 130 receives the beacon signal 120 from the transmitting device 110 at the first frequency on the lower frequency band $f_L$; see step 410. As mentioned, the first frequency may be 900 MHz, 2.4 GHz or 5 GHz. The beacon signal 120 is received using an omni-directional receive antenna 132 at the receiving device 130.

From the received beacon signal, the receiving device 130 then determines timing and/or frequency of the transmitting device 110, and adjusts its own timing and/or frequency according to the beacon signal; see steps 430 and 440. For example, the frequency on the higher band $f_H$ is synchronized to the beacon frequency on the lower frequency band $f_L$. Consequently, no calibration or accurate external RF source is required for frequency synchronization. In terms of time synchronization, the receiving device 130 determines its frame time boundary from the time by which the beacon signal is received.

In one example, the receiving device 130 does not try to use an 'absolute' accurate frequency. The receiving device 130 only tries to synchronize to the frequency used for beacon signal, even if the beacon frequency itself is inaccurate. Since the receiving device 130 periodically tracks the beacon frequency, the scheme can cope well with frequency drifting. The 'absolute' frequency accuracy in the receiving device 130 is not important as long as the receiving device 130 can track the frequency used by the transmitting device 110.

Once the receiving device 130 has adjusted its own timing and/or frequency based on the beacon signal 120, it sends a request signal to the transmitting device 110 to request for data; see step 440 in FIG. 4. The request signal may be sent at a frequency on the lower frequency band $f_L$ using an omni-directional transmit antenna 112 at the receiving device 130. There may also be an association phase, where the receiving device 130 notifies the transmitting device 110 of its presence and initiates an association with the transmitting device 110. Where applicable, quality of service parameters are negotiated between the transmitting 110 and receiving device 130. Further, there may be an authentication phase, where the receiving device 130 authenticates its identity with the transmitting device 110.

Upon receiving the request signal, the transmitting device 110 transmits data signal to the receiving device 130 at a second frequency on a higher frequency band $f_H$. As mentioned, the second frequency may be in the range of 57 to 64 GHz; see step 340 in FIG. 3. However, if no request signal is received, the transmitting device 110 continues to transmit the beacon signal 120 periodically at the lower frequency band.

The data signal 122 is transmitted using a directional transmit antenna 114 at the transmitting device 110. The receiving device 130 then receives the data signal 122 at the second frequency within the range of 57 to 64 GHz; see step 450 in FIG. 4. The data signal 122 is received using a directional receive antenna 134 at the receiving device 130.

While not shown in FIG. 1, it will be appreciated that the transmitting device 110 may also have an omni-directional receive antenna (RX_L) for receiving a signals on the lower frequency band and a directional receive antenna (RX_H) for receiving signals on the higher frequency band. Similarly, while not shown, the receiving device 130 may have corresponding omni-directional (TX_L) and directional (TX_H) transmit antennas operating at low and high frequency bands respectively.

Figure 5:
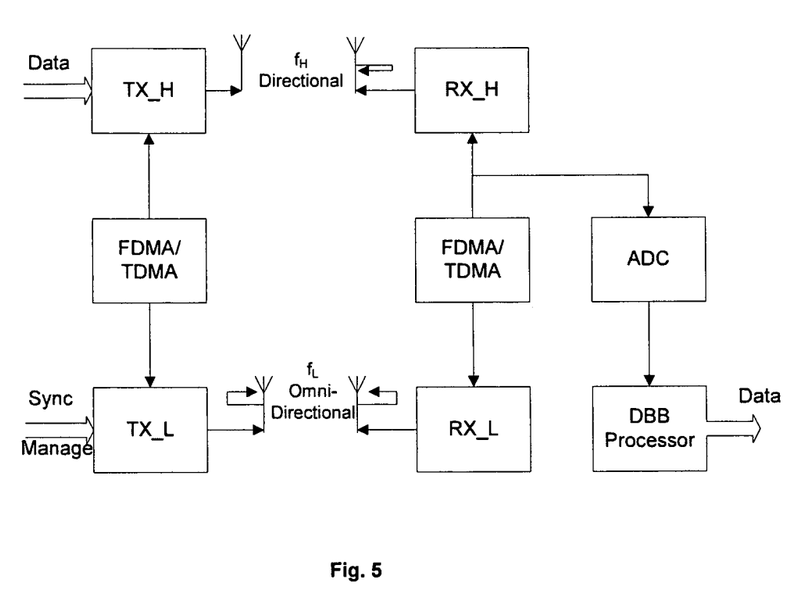
FIG. 5 is a schematic diagram of a communications device.

Referring now to FIG. 5, the periodic beacon signal may be transmitted as part of a Sync signal on a lower-frequency band $f_L$, which in this example is 2.4 GHz. The Sync signal also includes command and control signals exchanged between the transmitter (TX) and the receiver (RX).

The data transmitter (TX_H) operates on a higher-frequency band $f_H$, which in this embodiment is the 57 to 64 GHz band. The data and the Sync signals can thus be thought of as operating in a type of frequency-division multiplexing (FDM). In addition to being transmitted in FDM in this way, the data and Sync signals are transmitted using time-division multiplexing (TDM). This allows a single analog to digital converter (ADC) to be used in the receiver for both the Sync signal and the data signal. Similarly, while not shown in FIG. 5, the transmitter may use a single digital to analog converter (DAC) for both the data and Sync signals.

In this embodiment, it is further noted that the ADC of the receiver and the DAC of the transmitter are able to operate at a very high sampling frequency in order to effect the high data rates possible in the 57 to 64 GHz band. Accordingly, the Sync signal in this embodiment is not up converted by the transmitter nor down converted by the receiver, and is instead directly sampled. Notably, in this embodiment, the lower-frequency band $f_L$ carries a modulated signal and not an unmodulated carrier.

Figure 6:
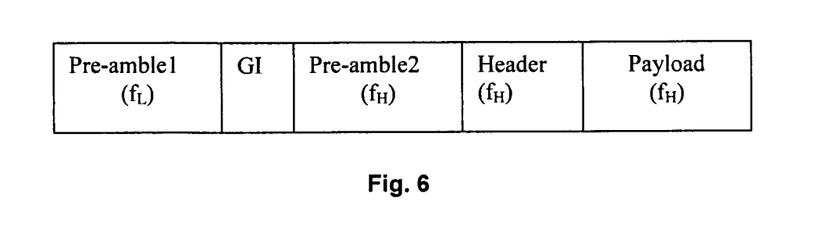
FIG. 6 is a schematic diagram of a data packet suitable for use with the system in FIG. 1.

To enable fine receiver tuning, such as carrier frequency and sampling frequency, and timing tuning, it is possible to transmit the pre-amble 1 on the first frequency $f_L$, followed by a guard interval, and the rest of the data packet on the second frequency $f_H$; as shown in FIG. 6.

Figure 7:
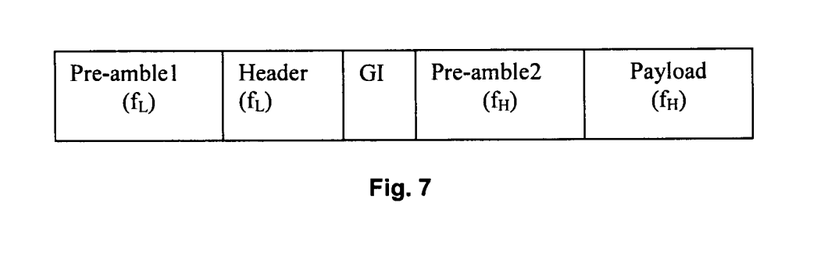
FIG. 7 is a schematic diagram of another data packet suitable for use with the system in FIG. 1.

To enable fine receiver tuning, such as carrier frequency and sampling frequency, and/or timing tuning, and/or reliable reception of the packet header, it is possible to transmit the pre-amble 1 and the packet header on the first frequency $f_L$, followed by guard interval, and the rest of the data packet on the second frequency $f_H$ as shown in FIG. 7.

Figure 8:
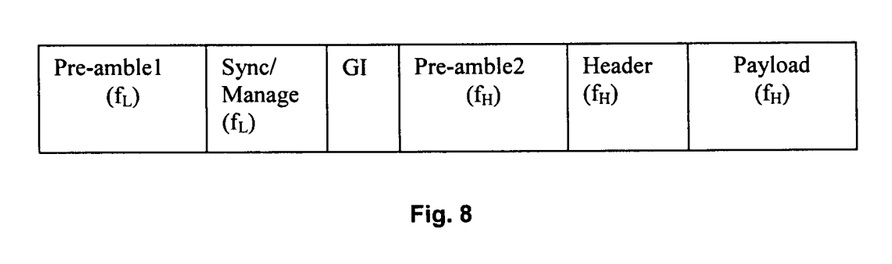
FIG. 8 is a schematic diagram of a further data packet suitable for use with the system in FIG. 1.

To enable fine receiver tuning, such as carrier frequency and sampling frequency, and/or timing tuning, and/or reliable reception of Sync/Manage message, it is possible to transmit the pre-amble 1 and the Sync/Manage message on the first frequency $f_L$, followed by guard interval, and the rest of the data packet on the second frequency $f_H$ as shown in FIG. 8.

Other packet arrangements are also possible.

The present embodiment is particularly suited to low-power 60 GHz or millimeter wave radio applications. For example, one suitable use for some embodiments of the present invention may be in an office conference room or the like, with the device and method of the present invention enabling laptops to wirelessly transmit large amounts of data within the room, such as transmitting lightly compressed video files to a projector, or a "Sync and go" file transfer.

Another suitable use for some embodiments of the present invention may be in an enterprise cubicle, allowing a laptop to transmit lightly compressed video to a monitor or display. Similarly, the laptop may wirelessly transmit to a printer or hard drive in near proximity.

A further use for some embodiments of the invention may be in the home environment, in allowing uncompressed video to be wirelessly transmitted within a room in a residence.

The data transport types in the above uses of some embodiments of the invention could include uncompressed video, lightly compressed video, local file transfer TCP/IP, web browsing TCP/IP, and/or hard disk transfer.

Further, it is estimated that the present embodiment provides at least a 10 times reduction in battery power during Sync periods, compared to a traditional approach. Further, this embodiment is estimated to provide improved mobility by providing a reduction of around $10^5$ in the time required for Sync, compared to a traditional approach applied at the same frequency.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

For example, if no beacon signal is received in step 410 in FIG. 4, the device itself shall send the a beacon signal periodically. The system design is thus symmetrical, although this device can be applied to an asymmetrical scenario.

The first frequency may in some embodiments be used partially for beam-forming and/or tracking.

The invention claimed is:

1. A method comprising:
 a receiving device receiving a beacon signal at a first radio frequency; and
 the receiving device using the beacon signal to synchronize reception of a data signal at a second radio frequency;
 wherein the first radio frequency is less than the second radio frequency such that the beacon signal experiences different frequency-dependent propagation effects relative to the data signal;
 wherein the beacon signal and the data signal are transmitted by a transmitting device;
 wherein the first radio frequency is in a 900 MHz band, a 2.4 GHz band, or a 5 GHz band;
 wherein the second radio frequency is in the range of 30 GHz to 300 GHz inclusive;
 wherein the beacon signal comprises a preamble of a data packet and the data signal comprises a remaining portion of the data packet.

2. The method of claim 1, wherein the second radio frequency is in the range of 57 to 64 GHz inclusive.

3. The method of claim 1, wherein the beacon signal is received using an omni-directional antenna.

4. The method of claim 1, wherein the data signal is received using a directional antenna.

5. The method of claim 1, further comprising determining timing or frequency, or both, of the transmitting device from the beacon signal.

6. The method of claim 5, further comprising adjusting timing or frequency, or both, of the receiving device based on the determined timing or frequency, or both.

7. The method of claim 1, wherein the beacon signal is a carrier-less digital signal.

8. The method of claim 7, further comprising sampling the beacon signal without down-mixing.

9. The method of claim 1, wherein the beacon signal and data signal are time division multiplexed.

10. The method of claim 1, further comprising converting the beacon signal and data signal using a shared digital-to-analog converter (DAC).

11. The method of claim 1 wherein the beacon signal is received at the first radio frequency as part of a sync signal.

12. The method of claim 11, wherein the sync signal further includes at least one of the following: an acknowledgement (ACK) signal, a feedback, a command signal, or control signal.

13. The method of claim 1, wherein the remaining portion of the data packet comprises a payload of the data packet.

14. A method comprising:
 a transmitting device transmitting a beacon signal at a first radio frequency; and
 the transmitting device transmitting a data signal at a second radio frequency, the beacon signal being useable to synchronize reception of the data signal;
 wherein the beacon signal and the data signal are received by a receiving device;
 wherein the receiving device uses the beacon signal to synchronize reception of the data signal;
 wherein the first radio frequency is less than the second radio frequency such that the beacon signal experiences different frequency-dependent propagation effects relative to the data signal;
 wherein the first radio frequency is in a 900 MHz band, a 2.4 GHz band, or a 5 GHz band;
 wherein the second radio frequency is in the range of 30 GHz to 300 GHz inclusive;
 wherein the beacon signal comprises a preamble of a data packet and the data signal comprises a remaining portion of the data packet.

15. The method of claim 14, wherein the second radio frequency is in the range of 57 to 64 GHz inclusive.

16. The method of claim 14, wherein the beacon signal is transmitted using an omni-directional antenna.

17. The method of claim 14, wherein the data signal is transmitted using a directional antenna.

18. The method of claim 14, wherein the remaining portion of the data packet comprises a payload of the data packet.

19. A receiving device comprising:
 a first antenna capable of receiving a beacon signal at a first radio frequency;
 a second antenna capable of receiving a data signal at a second radio frequency; and
 a processor configured to use the beacon signal to synchronize reception of the data signal;
 wherein the first radio frequency is less than the second radio frequency such that the beacon signal experiences different frequency-dependent propagation effects relative to the data signal;
 wherein the beacon signal and the data signal are transmitted by a transmitting device;

wherein the first radio frequency is in a 900 MHz band, a 2.4 GHz band, or a 5 GHz band;

wherein the second radio frequency is in the range of 30 GHz to 300 GHz inclusive;

wherein the beacon signal comprises a preamble of a data packet and the data signal comprises a remaining portion of the data packet.

20. The receiving device of claim 19, wherein the second radio frequency is in the range of 57 to 64 GHz inclusive.

21. The receiving device of claim 19, wherein the first antenna is an omni-directional antenna capable of receiving the beacon signal at the first radio frequency.

22. The receiving device of claim 19, wherein the second antenna is a directional antenna capable of receiving the data signal at the second radio frequency.

23. The receiving device of claim 19, wherein the processor is configured to determine timing or frequency, or both, of the transmitting device from the beacon signal.

24. The receiving device of claim 23, wherein the processor is configured to adjust timing or frequency, or both, of the receiving device based on the determined timing or frequency, or both.

25. The receiving device of claim 19, wherein the beacon signal is a carrier-less digital signal.

26. The receiving device of claim 25, wherein the processor is configured to sample the beacon signal without downmixing.

27. The receiving device of claim 19, wherein the beacon signal and data signal are time division multiplexed.

28. The receiving device of claim 19, further comprising a shared digital-to-analog converter configured to convert the beacon signal and the data signal.

29. The method of claim 19, wherein the first antenna is capable of receiving the beacon signal at the first radio frequency as part of a sync signal.

30. The receiving device of claim 29, wherein the sync signal further includes at least one of the following: an acknowledgement (ACK) signal, a feedback, a command signal, or control signal.

31. The receiving device of claim 19, wherein the remaining portion of the data packet comprises a payload of the data packet.

32. A transmitting device comprising:

a first antenna capable of transmitting a beacon signal at a first radio frequency;

a second antenna capable of transmitting a data signal at a second radio frequency, the data signal being usable to synchronize reception of the data signal;

wherein the beacon signal and the data signal are received by a receiving device;

wherein the receiving device uses the beacon signal to synchronize reception of the data signal;

wherein the first radio frequency is less than the second radio frequency such that the beacon signal experiences different frequency-dependent propagation effects to the data signal;

wherein the first radio frequency is in a 900 MHz band, a 2.4 GHz band, or a 5 GHz band;

wherein the second radio frequency is in the range of 30 GHz to 300 GHz inclusive;

wherein the beacon signal comprises a preamble of a data packet and the data signal comprises a remaining portion of the data packet.

33. The transmitting device of claim 32, wherein the second radio frequency is in the range of 57 to 64 GHz inclusive.

34. The transmitting device of claim 32, wherein the first antenna is an omni-directional antenna capable of transmitting the beacon signal at the first frequency.

35. The transmitting device of claim 32, wherein the second antenna is a directional antenna capable of transmitting the data signal at the second radio frequency.

36. The transmitting device of claim 32, wherein the remaining portion of the data packet comprises a payload of the data packet.

* * * * *